United States Patent
Patakula et al.

(10) Patent No.: US 8,036,372 B2
(45) Date of Patent: Oct. 11, 2011

(54) METHODS AND APPARATUS FOR DYNAMICALLY REALLOCATING A PREFERRED REQUEST TO ONE OR MORE GENERIC QUEUES

(75) Inventors: Balaji Patakula, Parlin, NJ (US); Sami Qutub, Freehold, NJ (US); Rafal Sitkowski, Old Bridge, NJ (US); David Sokoler, Colts Neck, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1081 days.

(21) Appl. No.: 11/291,105

(22) Filed: Nov. 30, 2005

(65) Prior Publication Data

US 2007/0121896 A1    May 31, 2007

(51) Int. Cl.
*H04M 3/00* (2006.01)

(52) U.S. Cl. ......... 379/266.01; 379/265.11; 379/265.12; 379/265.14; 379/266.03; 379/266.06

(58) Field of Classification Search ............ 379/265.01, 379/265.02, 266, 266.06
See application file for complete search history.

(56) References Cited

U.S. PATENT DOCUMENTS

| | | | | |
|---|---|---|---|---|
| 5,206,903 | A * | 4/1993 | Kohler et al. | 379/265.12 |
| 5,844,980 | A * | 12/1998 | Patel et al. | 379/88.22 |
| 6,032,184 | A * | 2/2000 | Cogger et al. | 709/223 |
| 6,157,655 | A * | 12/2000 | Shtivelman | 370/412 |
| 6,714,643 | B1 * | 3/2004 | Gargeya et al. | 379/266.06 |
| 7,133,520 | B1 * | 11/2006 | Doyle et al. | 379/265.01 |
| 2002/0067822 | A1 * | 6/2002 | Cohen et al. | 379/265.12 |
| 2002/0194047 | A1 * | 12/2002 | Edinger et al. | 705/9 |
| 2004/0062380 | A1 * | 4/2004 | Delaney | 379/265.02 |
| 2005/0195961 | A1 * | 9/2005 | Pasquale et al. | 379/265.02 |
| 2007/0201674 | A1 * | 8/2007 | Annadata et al. | 379/265.01 |

* cited by examiner

*Primary Examiner* — Curtis Kuntz
*Assistant Examiner* — Joseph J Nguyen
(74) *Attorney, Agent, or Firm* — Chapin IP Law, LLC; David W. Rouille, Esq.

(57) ABSTRACT

Methods and apparatus are provided for dynamically reallocating a preferred request in one or more specific queues to one or more generic queues. A preferred request in a specific queue can be reallocated to another queue. A specific queue is monitored to determine if a service level target will be satisfied. Thereafter, the preferred request is dynamically reallocated to another queue if the service level target will not be satisfied. The specific queue may be one of a plurality of queues, each having an assigned service level target. A performance level of the specific queue can be evaluated relative to the service level target. For example, the service level target can be a predicted wait time.

20 Claims, 3 Drawing Sheets

METHODS AND APPARATUS FOR DYNAMICALLY REALLOCATING A PREFERRED REQUEST TO ONE OR MORE GENERIC QUEUES

FIELD OF THE INVENTION

The present invention relates generally to the allocation of resources, and more particularly, to methods and apparatus for dynamically reallocating a preferred request in one or more specific queues to one or more generic queues.

BACKGROUND OF THE INVENTION

For many enterprise applications, finite resources must be allocated among a number of requests for such resources. In an enterprise call center, for example, incoming calls must often be routed to an appropriate call center agent at one or more local or remote call centers. Incoming calls are generally distributed among a number of agents within the call center who are each trained to handle certain types of incoming calls. A call center will normally be capable of handling many different types of received calls. For example, a call center may receive calls relating to each of a multitude of different products and/or services offered by the corresponding enterprise. The services and functions handled by a call center may include taking product orders, providing customer service, providing pricing and/or availability information, or a number of other functions. The types of calls that are supported by a call center are commonly referred to as the "skills" of the call center. Each skill typically has an associated queue for storing received calls until an appropriate agent is available to process the call.

It is often desirable that each of the different skills (and thus queues) associated with a call center be handled differently by the call center. In other words, some of the skills may be deemed by the enterprise to be more important than other skills and hence are to be given more attention or a higher level of service by the call center. Thus, a service level target is often defined for each of the different skills of the call center to indicate a desired level of service for the skill. However, past techniques for achieving the desired service levels for each of the skills of a call center have generally been inadequate. That is, actual performance levels for the different skills have not accurately reflected the desired service level targets defined for those skills.

A call center will often have specific queues for storing received calls having a particular purpose and non-specific queues for storing received calls of a more general purpose. Typically, each specific queue is serviced by a particular call center agent. For example, in the context of a financial institution, a certain broker or employee may be assigned to address all communications from a particular customer. Such requests are often referred to as preferred resource requests. It is generally assumed that only the agent associated with a specific queue (or preferred request) can handle the preferred requests in the specific queue. Generally, the agent associated with a specific queue will sequentially service the preferred requests from the specific queue, at the expense of other queues, such as non-specific queues, that the agent may be qualified to service.

Nonetheless, the specific resource associated with a preferred request may be busy with other requests or otherwise unavailable to handle the preferred request within a time frame that satisfies the service level targets that have been defined for the specific queue. Static time-out periods have been employed for specific queues that will transfer the call to a non-specific queue when the waiting time for the preferred request exceeds a predefined threshold. While such static time-out periods provide a mechanism for limiting the waiting time of a preferred request they do not account for any dynamic factors that may be available in the resource allocation system. A need therefore exists for methods and apparatus for dynamically reallocating a preferred request in one or more specific queues to one or more generic queues.

SUMMARY OF THE INVENTION

Generally, methods and apparatus are provided for dynamically reallocating a preferred request in one or more specific queues to one or more generic queues. According to one aspect of the invention, a preferred request in a specific queue can be reallocated to another queue. A specific queue is monitored to determine if a service level target will be satisfied. Thereafter, the preferred request is dynamically reallocated to another queue if the service level target will not be satisfied.

The specific queue may be one of a plurality of queues, each having an assigned service level target. A performance level of the specific queue can be evaluated relative to the service level target. For example, the service level target can be a predicted wait time.

A more complete understanding of the present invention, as well as further features and advantages of the present invention, will be obtained by reference to the following detailed description and drawings.

DETAILED DESCRIPTION

The present invention provides methods and apparatus for dynamically reallocating preferred request in one or more specific queues to one or more generic queues. In this manner, the present invention allows a preferred request in one or more specific queues 120 to be handled by any resource in a specified group of resources when a specific resource is unavailable to handle the preferred request in a manner that satisfies one or more business goals (as specified, for example, using one or more service level targets).

While the invention is generally illustrated in conjunction with the processing of calls in an exemplary call center, the invention is not limited to use with any particular type of call center or communication processing application. For example, the invention is applicable to the processing of both incoming and outgoing communications. The disclosed techniques can be used with automatic call distribution (ACD) systems, telemarketing systems, private-branch exchange (PBX) systems, computer-telephony integration (CTI)-based systems, as well as in combinations of these and other types of call centers. A call center in accordance with the invention may be configured using any type of network infrastructure, such as, e.g., asynchronous transfer mode (ATM), local area networks, wide area networks or Internet Protocol (IP) networks. The term "call center" as used herein is thus intended to include any type of ACD system, telemarketing system or other communication system that processes calls or other service requests, including voice calls, video calls, multimedia calls, e-mail, faxes, text chat or voice messages as well as various portions or combinations of these and other types of communications. The term "call" as used herein is intended to include any of the above-noted types of communications as well as portions or combinations of these and other communications.

Figure 1:
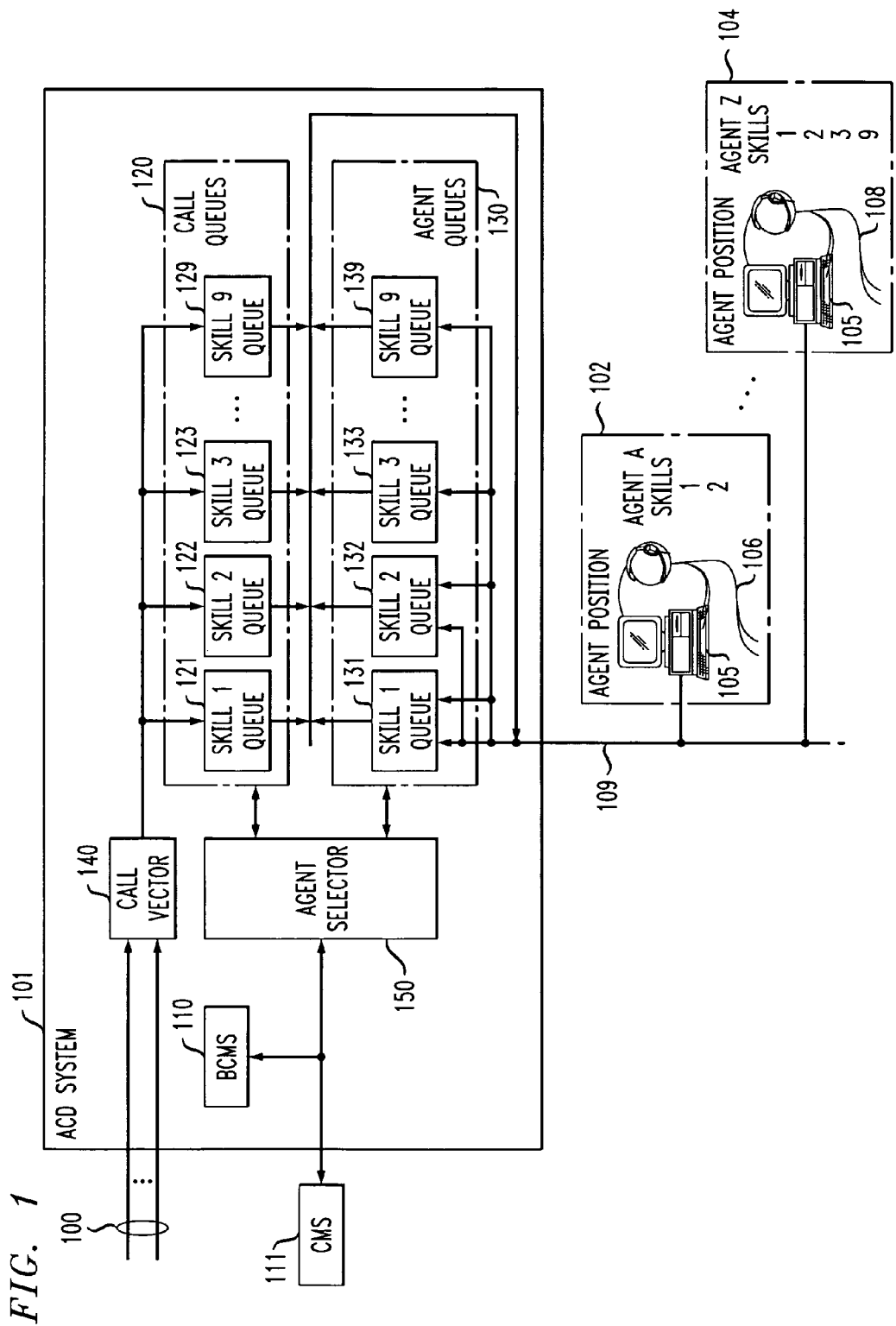
FIG. 1 shows an illustrative call center in which the present invention may be implemented.

FIG. 1 shows an illustrative call center in which the present invention may be implemented. The call center includes a number of telephone lines and/or trunks 100 selectively interconnected with a plurality of agent positions 102-104 via an ACD system 101. Each agent position 102-104 includes a voice-and-data terminal 105 for use by a corresponding agent 106-108 to handle calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101.

Figure 2:
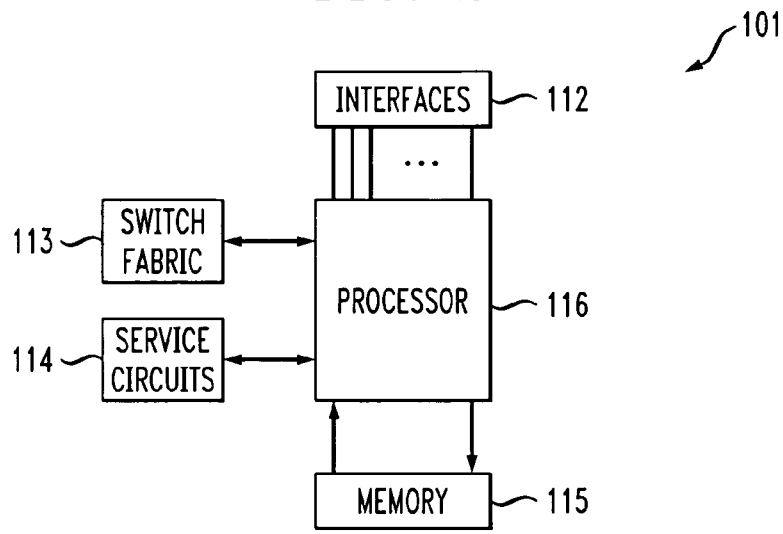
FIG. 2 shows a simplified block diagram of one possible implementation of the automatic call distribution system of FIG. 1.

The ACD system 101 may be implemented in a manner similar to, for example, the Avaya Communication Manager™ from Avaya Inc. of Basking Ridge, N.J. or the Definity™ PBX-based ACD system from Lucent Technologies. FIG. 2 shows a simplified block diagram of one possible implementation of the ACD system 101. The system 101 as shown in FIG. 2 is a stored-program-controlled system that includes interfaces 112 to external communication links, a communications switching fabric 113, service circuits 114 (e.g., tone generators and announcement circuits), a memory 115 for storing control programs and data, and a processor 116 (e.g., a microprocessor, a CPU, a computer, etc. or various portions or combinations thereof) for executing the stored control programs to control the interfaces and the fabric, to provide automatic call distribution functionality, and to provide storage of e-mails, faxes and other communications.

Referring again to FIG. 1, exemplary data elements stored in the memory 115 of ACD system 101 include a set of call queues 120 and a set of agent queues 130. Each call queue 121-129 in the set of call queues 120 corresponds to a different agent skill, as does each agent queue 131-139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. As indicated above, the call queues 120 includes at least one specific queue and at least one non-specific queue. Each specific queue and each non-specific queue has an assigned service level target. As discussed hereinafter, when a resource becomes available, the performance levels of the specific and non-specific queues are evaluated relative to the service level targets defined for each queue. Thereafter, the available resource is assigned to service the request from one queue 120.

Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121-129 based upon the agent skill that they require for proper handling. Agents 106-108 who are available for handling calls are assigned to agent queues 131-139 based upon the skills which they possess. An agent may have multiple skills, and hence may be assigned to multiple agent queues 131-139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131-139 at different expertise levels.

Call vectoring is described in greater detail in Definity™ Communications System Generic 3 Call Vectoring/Expert Agent Selection (EAS) Guide, AT&T Publication No. 555-230-520, Issue 3, November 1993, which is incorporated by reference herein. Skills-based ACD techniques are described in greater detail in, for example, U.S. Pat. No. 5,206,903 issued Apr. 27, 1993 in the name of inventors J. E. Kohler et al. and entitled "Automatic Call Distribution Based on Matching Required Skills with Agents Skills," which is incorporated by reference herein.

Another program executing in ACD system 101 is an agent selector 150. Selector 150 may be implemented in software stored either in the memory 115 of system 101, in a peripheral memory (e.g., a disk or CD-ROM) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system.

Further details regarding call processing in a system such as ACD system 101 can be found in, for example, U.S. Pat. No. 5,905,793 in the name of inventors A. D. Flockhart et al. and entitled "Waiting-Call Selection Based on Anticipated Wait Times," and U.S. Pat. No. 6,192,122, in the name of inventors A. D. Flockhart et al. and entitled "Call Center Agent Selection that Optimizes Call Wait Times," both of which are incorporated by reference herein.

In accordance with the present invention, the call center of FIG. 1 is configured to apply predictive resource allocation techniques to both specific and non-specific queues 120. For a more detailed discussion of queue management techniques, see, for example, U.S. Pat. Nos. 5,206,903 and 6,636,598, each incorporated by reference herein.

Figure 3:
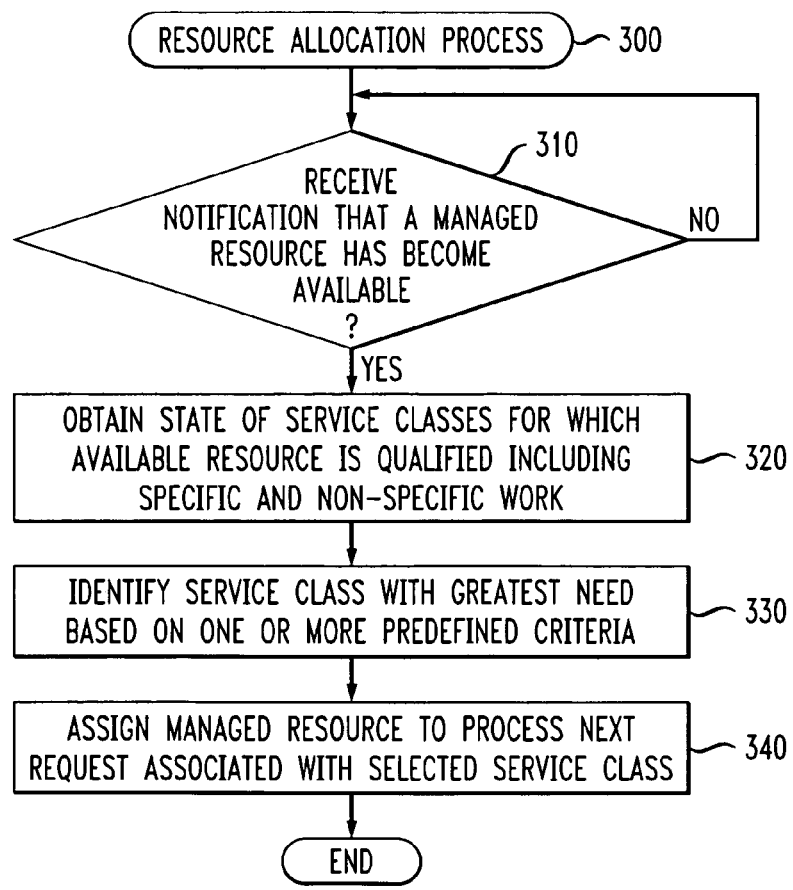
FIG. 3 is a flow chart describing an exemplary implementation of a resource allocation process incorporating features of the present invention.

FIG. 3 is a flow chart describing an exemplary implementation of a resource allocation process 300 incorporating features of the present invention. As shown in FIG. 3, the exemplary resource allocation process 300 is initiated during step 310 upon a notification that a managed resource has become available. For example, in an exemplary call center implementation, an agent may become available upon the successful completion of a prior call.

Once it is determined during step 310 that a managed resource has become available, the available managed resource is matched with a request during steps 320 through 340.

After a resource becomes available, the exemplary resource allocation process 300 obtains the state of the service classes for which the managed resource is qualified (i.e., capable), including specific and non-specific queues during step 320. The state of service classes may be obtained, for example, using a publish/subscribe mechanism and may be cached by each resource manager.

In one exemplary embodiment, each service class can progress through multiple states. Each state indicates that the service class is in greater need than the previous state. For example, each state indicates how close the service class is to exceeding its target or how much the service class has progressed beyond its target. It is noted that the "greatest need" generally does not mean that the customer is in the greatest need to speak to an agent. The "greatest need" is based on one or more predefined criteria for selecting which queue 120 should be chosen to meet or preserve goals for customer service and to give customers the desired level of service.

In one exemplary embodiment, one of the following five service class states can be assigned to a queue 120 to indicate the current performance level: over served, within range, future jeopardy, current jeopardy, over threshold. For example, the following table shows the service class states for each of the exemplary call queues 120 shown in FIG. 1:

| Queue No. | Queue Type | Current Service Class State |
|---|---|---|
| Queue 1 | Non-Specific | Within Range |
| Queue 2 | Specific | Within Range |
| Queue 3 | Non-Specific | Over Threshold |
| Queue 4 | Non-Specific | Over Served |
| Queue 5 | Specific | Over Threshold |
| Queue 6 | Non-Specific | Within Range |
| Queue 7 | Non-Specific | Current Jeopardy |
| Queue 8 | Non-Specific | Future Jeopardy |
| Queue 9 | Specific | Within Range |

The service class with the greatest need is identified during step 330 based on one or more predefined criteria. In one exemplary implementation, when multiple service classes are in a state that indicates the greatest need, the resource allocation process 300 prioritizes the assignment of requests to local resources. If the service classes in greatest need include at least one local service class, a local service class is selected. If no local service classes are in greatest need, a remote service class with the greatest need is selected. If two or more remote service classes are in the same state, services classes are selected, for example, based on a round-robin technique, selecting the remote service class with the oldest time stamp. The logical resource manager optionally applies a time stamp to a remote service class when an agent offered for that service class has been accepted.

Once the service class with the greatest need is selected during step 330, the managed resource is assigned during step 340 to process the next request associated with the selected service class. For example, if the service class with the greatest need is a local service class, the request can be obtained from the associated queue 120. If, however, the service class with the greatest need is a remote service class, then the resource can be offered to a remote resource manager, to be matched to work queued at the remote service class.

It is noted that the matching of requests to managed resources can be restricted to resources in a specific location or region, for example, by adding a location qualifier to the service classes. The location qualifier can apply to only one site, or to a region (group of sites). The location qualifier restricts contacts in the service class to be delivered only to that location. For example, a location qualifier can ensure that email contacts received in given country are only handled by agents in the same country.

As indicated above, a call center agent can have one or more capability sets. Each capability set should include the same qualifiers as a service class that the agent can handle. The capability sets are used to match a contact with the agent. If the qualifiers in a capability set match the qualifiers in the service class for a contact, the resource allocation process 300 matches the contact to the agent.

In this manner, the present invention allows a preferred request in one or more specific queues 120 to be handled by any resource in a specified group of resources when a specific resource is unavailable to handle the preferred request in a manner that satisfies one or more business goals (service level targets).

Figure 4:
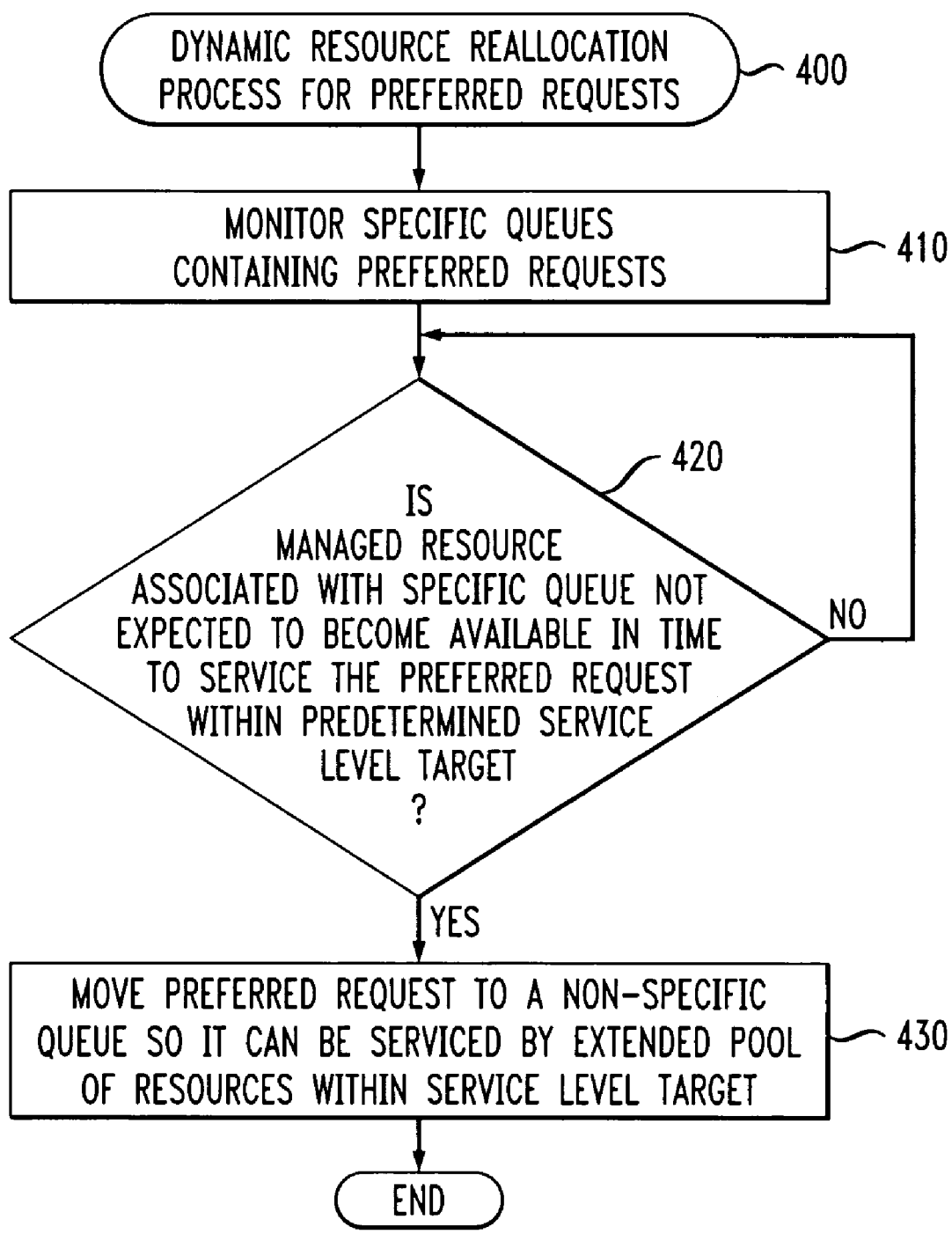
FIG. 4 is a flow chart describing an exemplary implementation of a dynamic resource reallocation process for preferred requests incorporating features of the present invention.

FIG. 4 is a flow chart describing an exemplary implementation of a dynamic resource reallocation process for preferred requests 400 incorporating features of the present invention. As shown in FIG. 4, the dynamic resource reallocation process for preferred requests 400 continues to monitor specific queues containing preferred requests during step 410 to ensure that the service level targets for the queues will be satisfied. The dynamic resource reallocation process for preferred requests 400 attempts to predictively and dynamically reallocate preferred requests if the service level targets, such as predicted wait time, will not be satisfied.

A test is performed during step 420 to determine if a managed resource associated with a specific queue is not expected to become available in time to service one or more preferred requests within a predetermined service level target. Once it is determined during step 420 that a preferred request will not be serviced within the predetermined service level target, then the preferred request is moved during step 430, for example, to a non-specific queue so that it can be serviced by an extended pool of resources within the specified service level target.

It is noted that while the resource allocation process 300 of FIG. 3 and the dynamic resource reallocation process for preferred requests 400 of FIG. 4 are illustrated as two distinct processes, these processes may be integrated into a single process that assigns resources to requests, and continues to dynamically reallocate the requests if service level targets will not be met.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for reallocating a preferred request in a specific queue to a generic queue, comprising:
    monitoring said specific queue to determine if a service level target will be satisfied, wherein said specific queue is one of a plurality of queues, each of said specific queues having an assigned service level target and associated with a specific resource, wherein said service level target is a predicted wait time;
    dynamically reallocating said preferred request to a generic queue if said service level target will not be satisfied wherein said generic queue is handled by any resource in a group of resources by reassigning said request to a queue having one or more capable resources to process said preferred request;
    identifying the capable resources by matching agents having a capability set corresponding to the specific resource, the capability set defined by skills possessed by a particular agent for responding to the preferred request;
    determining the capability set of agents and assigning the agent to one or more queues, each assigned queue associated to the resource corresponding to the determined capability set, wherein the specific queue and the generic queue each have service level targets, each the specific queue and the generic queue corresponding to a set of agent skills possessed by the agent assigned to the queue, reassigning occurring when a service level status indicative of meeting the service level target is more likely for the generic queue and both the specific queue and the generic queue are associated with the resource for responding to the preferred request; and
    identifying the queues with the service level status indicative of the greatest need, and if multiple queues have a service level status that indicates the greatest need, prioritizing the assignment of the preferred requests to local resources by selecting a local service class and if no said local service class is available, selecting a remote service class.

2. The method of claim 1, further comprising the step of evaluating a performance level of said specific queue relative to said service level target.

3. The method of claim 1, wherein said monitoring step further comprises the step of evaluating a state of one or more queues associated with said preferred request.

4. The method of claim 1, further comprising the step of maintaining state information for a plurality of queues.

5. The method of claim 1, wherein said preferred request is a communication sent to a call center.

6. The method of claim 1 wherein said dynamically reallocating said preferred request to a generic queue occurs when the specific resource of said specific queue is unavailable to handle said preferred request in a manner that satisfies said service level target.

7. A system for reallocating a preferred request in a specific queue to a generic queue, comprising:
    a memory comprising a plurality of queues, said plurality of queues including at least one specific queue and at least one generic queue, each of said specific and generic queues having an assigned service level target; and
    at least one processor, coupled to the memory, operative to:
    monitor said specific queue to determine if a service level target will be satisfied, wherein said specific queue is one of a plurality of queues, each of said specific queues having an assigned service level target and associated with a specific resource and wherein said service level target is a predicted wait time;
    dynamically reallocate said preferred request to a generic queue if said service level target will not be satisfied, wherein said generic queue is handled by any resource in a group of resources, dynamically reallocating further including reassigning said request to a queue having one or more capable resources to process said preferred request;
    identify the capable resources by matching agents having a capability set corresponding to the specific resource, the capability set defined by skills possessed by a particular agent for responding to the preferred request; and
    determine the capability set of agents and assigning the agent to one or more queues, each assigned queue associated to the resource corresponding to the determined capability set, wherein the specific queue and the generic queue each have service level targets, each the specific queue and the generic queue corresponding to a set of agent skills possessed by the agent assigned to the queue, reassigning occurring when a service level status indicative of meeting the service level target is more likely for the generic queue and both the specific queue and the generic queue are associated with the resource for responding to the preferred request; and
    identify the queues with the service level status indicative of the greatest need, and if multiple queues have a service level status that indicates the greatest need, prioritize the assignment of the preferred requests to local resources by selecting a local service class and if no said local service class is available, select a remote service class.

8. The system of claim 7, wherein said processor is further configured to evaluate a performance level of said specific queue relative to said service level target.

9. The system of claim 7, wherein said processor is further configured to evaluate a state of one or more queues associated with said preferred request.

10. The system of claim 7, wherein said processor is further configured to maintain state information for a plurality of queues.

11. The system of claim 7, wherein said processor dynamically reallocates said preferred request to another queue if said service level target will not be satisfied by reassigning said request to a queue having one or more capable resources to process said preferred request.

12. The system of claim 7, wherein said preferred request is a communication sent to a call center.

13. The system of claim 7, wherein said specific queue is one of a plurality of queues, each of said queues having an assigned service level target.

14. The system of claim 7, further comprising the step of evaluating a performance level of said specific queue relative to said service level target.

15. The system of claim 7 wherein said dynamically reallocating said preferred request to a generic queue occurs when the specific resource of said specific queue is unavailable to handle said preferred request in a manner that satisfies said service level target.

16. In an automatic call distribution environment having generic queues and specific queues, the specific queues designated for servicing by a particular skill resource, a set of computer program instructions encoded on a non-transitory computer readable storage medium, the instructions for performing a method of dynamically reallocating a request from a specific queue to a generic queue comprising:
    identifying a request enqueued in a specific queue corresponding to a skill resource responsive to the request, the request enqueued in the specific queue based on a matching of the request to the skill resource provided by the specific queue;
    determining that the specific queue is unable to meet a service level target expected of the specific queue, the service level based on a delay in servicing the request by an agent providing the skill resource;
    in response to determining inability to meet the service level target, determining based on a service level status indicative of meeting the service level target, removing the request from the specific queue and placing the removed request in a generic queue, the specific queue for accessing a resource corresponding to the a skill set expected by the request, and the generic queue for accessing an available resource within the service level target established for the generic queue; and
    identifying the queues with the service level status indicative of the greatest need, and if multiple queues have a service level status that indicates the greatest need, prioritizing the assignment of the preferred requests to local resources by selecting a local service class and if no said local service class is available, selecting a remote service class.

17. The method of claim 16 wherein the resource is a call agent possessing the skill set expected by the request, the specific queues corresponding to a skill needed for servicing requests in the specific queues, the skills possessed by an agent responsive to the specific queues.

18. The method of claim 17 further comprising computing the service level target based on a predicted wait time for servicing the request.

19. The method of claim 18 wherein reassigning requests to generic queues is performed based on a service class status of the specific queue, the service class status indicative of the specific queue failing to meet the corresponding service level target.

20. The method of claim 16 further comprising placing incoming calls as requests in one of a plurality of call queues based on matching a skill set expected by an initiator of the call and a resource provided by the call queue, the call queues including at least one of the generic queues and at least one of the specific queues.

* * * * *